United States Patent [19]

Ford

[11] Patent Number: 5,395,515

[45] Date of Patent: Mar. 7, 1995

[54] WASTE DISPOSAL TRAY FOR AN AUTOMATIC COFFEE MAKER

[75] Inventor: David F. Ford, Springfield, Ill.

[73] Assignee: Bunn-O-Matic Corporation, Springfield, Ill.

[21] Appl. No.: 63,491

[22] Filed: May 18, 1993

Related U.S. Application Data

[62] Division of Ser. No. 857,464, Mar. 25, 1992, Pat. No. 5,245,915.

[51] Int. Cl.[6] .......................................... B01D 35/147
[52] U.S. Cl. ...................................... 210/86; 210/104; 210/477; 210/482; 99/289 R
[58] Field of Search ................. 210/86, 104, 477, 482; 99/280, 281, 289 R

[56] References Cited

U.S. PATENT DOCUMENTS

| | | | |
|---|---|---|---|
| 3,589,271 | 6/1971 | Tarrant | 99/280 |
| 4,949,627 | 8/1990 | Nordskog | 99/281 |
| 5,049,263 | 9/1991 | Hoffman et al. | 210/86 |
| 5,245,915 | 9/1993 | Ford . | |

Primary Examiner—Robert A. Dawson
Assistant Examiner—W. L. Walker
Attorney, Agent, or Firm—Trexler, Bushnell, Giangiorgi & Blackstone, Ltd.

[57] ABSTRACT

A tray assembly for use in receiving and retaining used moist brewing substances and the like from a beverage brewing apparatus and separating a liquid portion therefrom. The tray assembly is in communication with an entry port which deposits moist brewing substances therein. A drain line in the brewing apparatus carries separated liquids away from said tray assembly. The tray assembly includes a tray body, a liquid separation portion retained in said tray body for drawing off liquids from moist brewing substances, and a controllably sealable tray valve assembly attached to the tray body and operatively engaging the drain line for draining liquids from the tray assembly. A first area in the tray body between the entry port and the liquid separation portion communicates with the entry port and defines a receiving and retaining space. A second area in the tray body between the liquid separating portion and the valve assembly communicates with the tray valve assembly and defines a liquid collection space. Drained brewing substance is retained in the receiving and retaining space for removal at a later time. Liquid drawn off of the brewing substance into the liquid collection space flows from the tray assembly out through the tray valve assembly when engaged with the drain line.

5 Claims, 4 Drawing Sheets

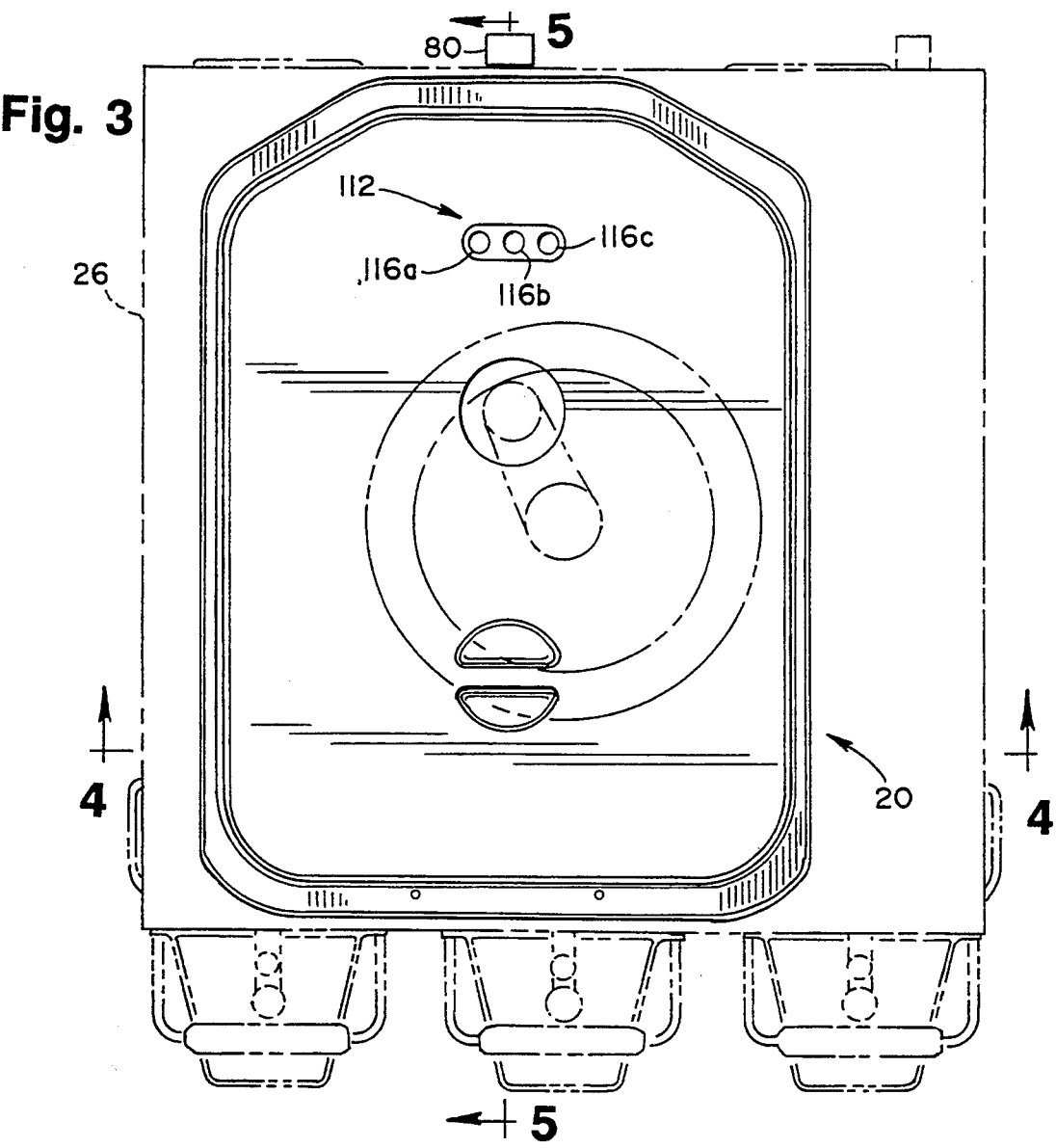
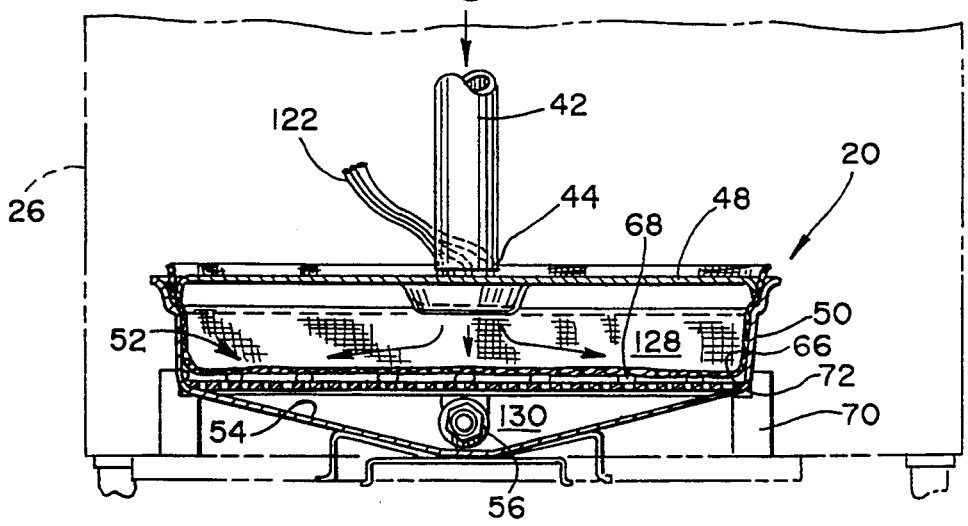

Fig. 6
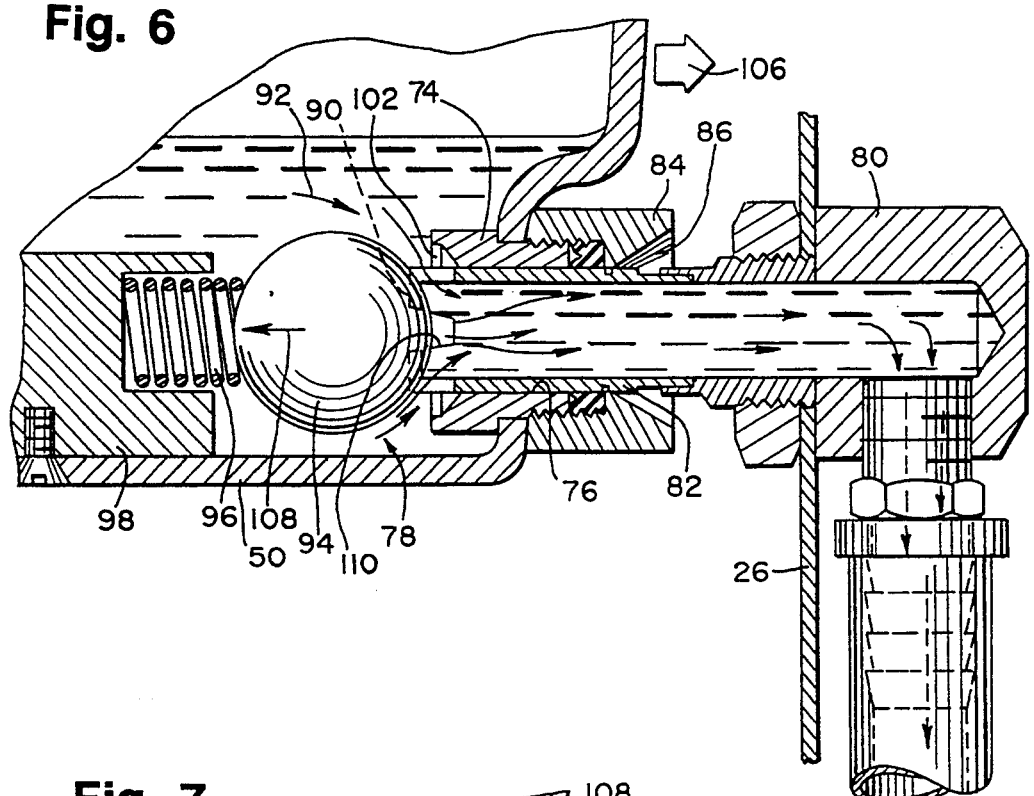
Fig. 7
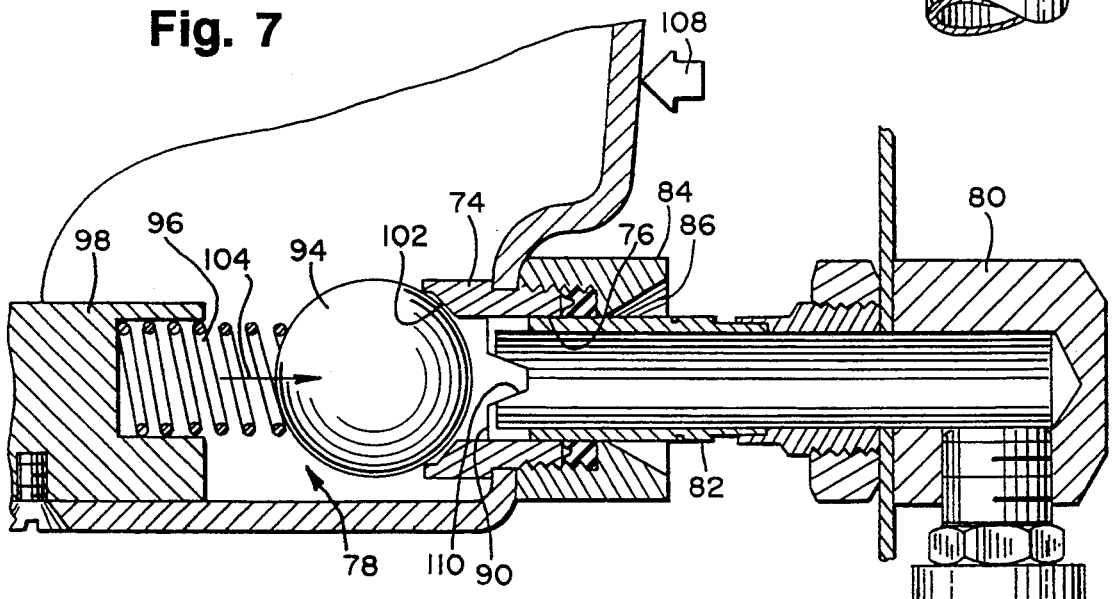
Fig. 8
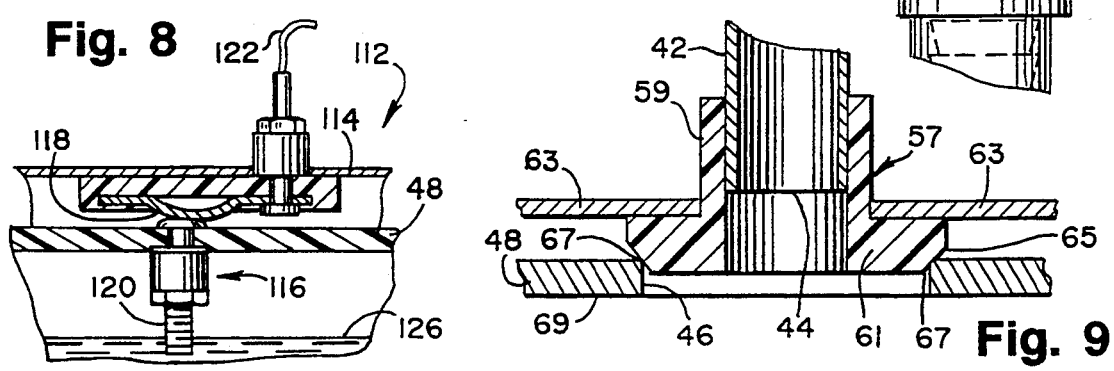
Fig. 9

WASTE DISPOSAL TRAY FOR AN AUTOMATIC COFFEE MAKER

This is a divisional of co-pending application Ser. No. 07/857,464, filed on Mar. 25, 1992, which is now U.S. Pat. No. 5,245,915.

BACKGROUND OF THE INVENTION

The present invention pertains to tray assemblies for use with beverage brewing devices. More particularly, the present invention pertains to tray assemblies which receive and retain a spent brewing material from a beverage brewing apparatus and extract a liquid portion of the spent beverage brewing substance.

Beverage brewing devices are commonly used in high volume applications such as restaurants, catering organizations and other high volume food production institutions. A typical beverage brewing apparatus has a body which positions a funnel below a heated water source. The funnel contains a beverage brewing substance which is infused with heated water dispensed into the funnel to produce a brewed beverage. A brewed beverage is drained from the funnel into a serving decanter positioned underneath the funnel.

Such a beverage brewing device requires that the beverage brewing substance be measured and deposited into the funnel for each batch of beverage produced. Additionally, this activity inherently requires the removal of the spent brewing substance after it has been infused with hot water and a brewed beverage produced therefrom. The need to fill the funnel with a beverage brewing substance and remove the spent substance from the funnel is extremely labor intensive and prone to error due to mismeasurement or failure to remove the spent brewing substance from the funnel before producing another batch of brewed beverage.

Recently, beverage brewing devices have been produced which introduce a high degree of automation to the beverage brewing process. Such a device is shown in pending U.S. Pat. No. 5,134,925 to Bunn et al., issued Aug. 8, 1992. The device shown in Bunn et al. includes an automatic brewing substance dispenser for dispensing a predetermined amount of beverage brewing substance into a brewing chamber. The brewing process is automated including automatically controlled brewing, dispensing, and chamber cleaning. After the brewing process is complete, the spent brewing substance is exhausted from the brewing chamber through an exhaust tube into a waste collection container.

A problem arises, however, in handling the spent brewing substance. The volume of the brewing substance and waste water requires frequent periodic removal and dumping. In other words, it would be desirable to accumulate the spent brewing substance from numerous brewing cycles in order to reduce the amount of manual labor required in servicing the brewing device.

Another problem arises with the accumulation of spent brewing substance such that a large proportion of the waste product is waste water which is retained by the brewing substance itself during the brewing process. Additionally, it is common for brewing devices, such as the one shown in Bunn et al., to dispense waste water used to clean the brewing chamber into the common waste collection hopper. As such, a substantial quantity of water must be dealt with in disposing of the spent brewing substance. Attendant with the accumulation of the spent brewing substance and water is the problem of the weight of the container used to collect such waste products. Therefore, it would be desirable to provide a small waste removal container which drains off the liquid portion of the waste materials and permits the accumulation of several brew cycles worth of spent brewing substance.

One possible solution to the waste material problem that may have been tried is to simply drain all of the combined spent brewing substance and waste water down a common drain. However, this solution may not be feasible in some areas which restrict the amount of material which can be flushed down a waste sewer along with waste liquids. Further, the plumbing requirements to flush substantial quantities of solid materials may not be available or may be cost prohibitive since they are substantially greater than those for merely draining water and other liquids.

Another problem that arises with the accumulation of spent brewing substances in brewing devices is that the spent brewing substance creates a great deal of steam and moisture which, if allowed to travel into the brewing device, may create many problems. For example, when spent brewing substances are disposed in a brewing basket, the steam rises off of the substance as the substance cools in the waste collection tray. Since the trays are positioned at the bottom of the brewing devices, the steam rising off of the spent brewing substance rises through the brewing device. While the brewing chamber is designed to brew substances, it is difficult to protect the internal components of the brewing device from the detrimental effects of the rising steam. In particular, when the brewing device includes a brewing substance dispenser, the steam may have an extremely detrimental effect on the brewing substance retained in the substance dispenser. For example, if ground coffee is retained in the substance dispenser, the steam may cause the ground coffee to cake and therefore not be properly dispensed into the brewing chamber.

As such, it is desirable to provide a tray assembly which can be inserted into the beverage brewing device to receive and retain spent brewing substances and waste water and drain the liquid portion therefrom. Further, it is desirable to provide a tray which prevents steam from the spent brewing substance from escaping from the tray.

OBJECTS AND SUMMARY OF THE INVENTION

A general object of the present invention is to provide a tray assembly for collecting moist, spent brewing substances and waste water from a brewing apparatus and separating the liquid portion of such waste from the moist brewing substance.

Another object of the present invention is to provide a tray assembly which drains a liquid portion of the moist, spent brewing substance from the tray assembly so that only a drained brewing substance is retained in the tray assembly for removal at a later time.

Yet another object of the present invention is to provide a tray assembly which has a valve assembly which automatically seals the tray assembly against leakage when the tray is removed from the brewing apparatus.

Still another object of the present invention is to provide a tray assembly which senses when the tray is full of drained brewing substance and which indicates that the tray must be emptied.

Briefly, and in accordance with the foregoing, the present invention comprises a tray assembly for use in receiving and retaining moist brewing substances and the like from a beverage brewing apparatus. The tray assembly collects moist, spent brewing substances and removes a liquid portion, leaving a drained spent brewing substance in the tray for later removal. The tray assembly includes a tray body, a liquid separation portion retained in said tray body for drawing off liquids from moist brewing substances, and a controllably sealable tray valve assembly. The valve assembly is attached to the tray body and operatively engages a drain line of the brewing apparatus for draining liquids from the tray assembly out of the tray body. An entry port extending from the brewing apparatus communicates with the tray assembly and deposits moist brewing substances into the tray body. A first area in the tray body between the entry port and the liquid separation portion receives moist brewing substances from the entry port and defines a receiving and retaining space. A second area in the tray body between the liquid separating portion and the valve assembly communicates with the tray valve assembly and defines a liquid collection space. Drained brewing substance is retained in the receiving and retaining space for removal at a later time. Liquid which is drawn off of the brewing substance into the liquid collection space flows from the tray assembly out through the tray valve assembly when engaged with the drain line.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 3 is a cross sectional plan view of the tray assembly of the present invention taken along line 3—3 in FIG. 1 showing the tray assembly in engagement with a drain line exiting from the brewing apparatus and showing the outline of the brewing apparatus in phantom line;

FIG. 4 is partial fragmentary cross sectional front view of the tray assembly of the present invention taken along line 4—4 in FIG. 3 showing support members which support the tray assembly in the compartment;

FIG. 6 is an enlarged partial fragmentary cross sectional side elevational view of the valve assembly of the present invention taken along line 6—6 in FIG. 3 showing a valve portion in engagement with a drain line nipple;

FIG. 7 is an enlarged partial fragmentary cross sectional side elevational view of the valve assembly of the present invention as shown in FIG. 6 in which the valve portion is disengaged from the drain line nipple and the tray valve portion is sealed against leakage;

FIG. 8 is an enlarged side sectional view of a contact assembly as shown in FIG. 5; and FIG. 9 is an enlarged, cross sectional, side view of a sealing member which engages an aperture formed in a cover of the tray assembly to seal the aperture and thus prevent the escape of steam which rises off of the spent brewing substance disposed in the tray.

DETAILED DESCRIPTION OF THE ILLUSTRATED EMBODIMENT

Figure 1:
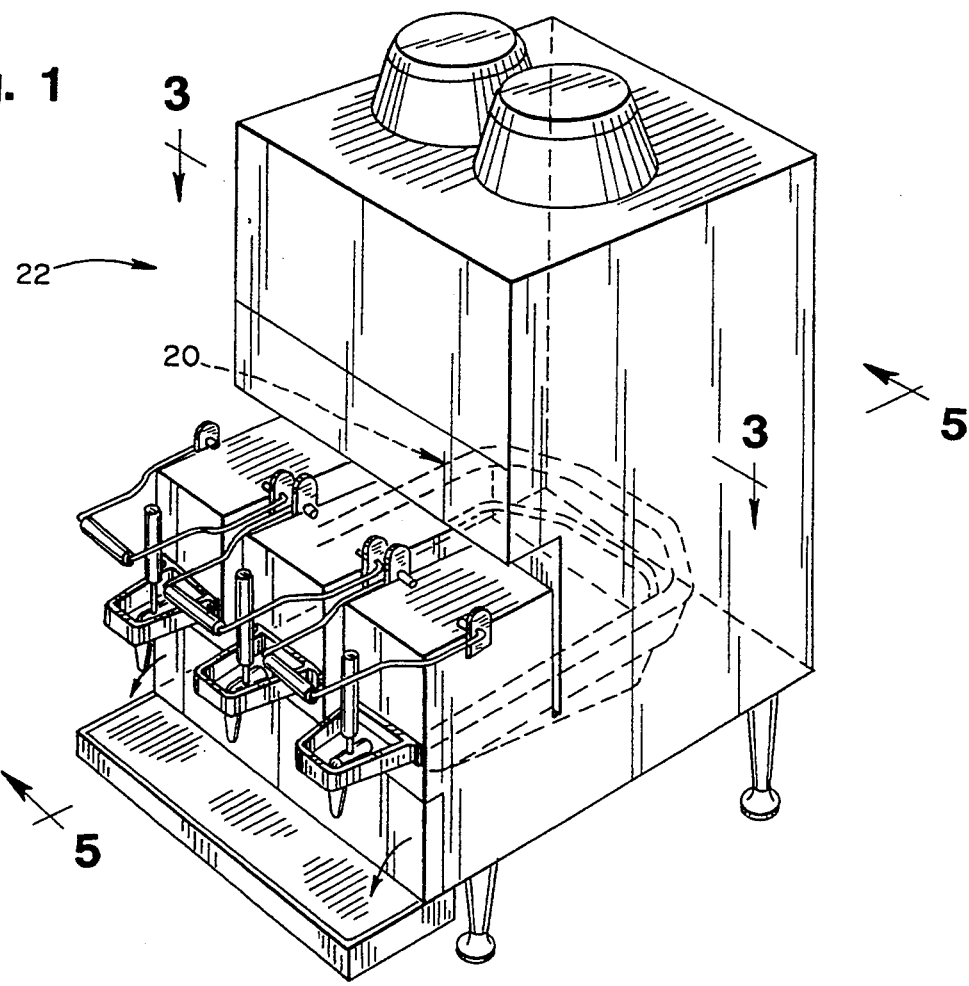
FIG. 1 is a perspective view of a brewing apparatus in which the present invention is used and further showing showing a waste tray assembly of the present invention positioned in a compartment in a lower portion of the brewing apparatus.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Figure 5:
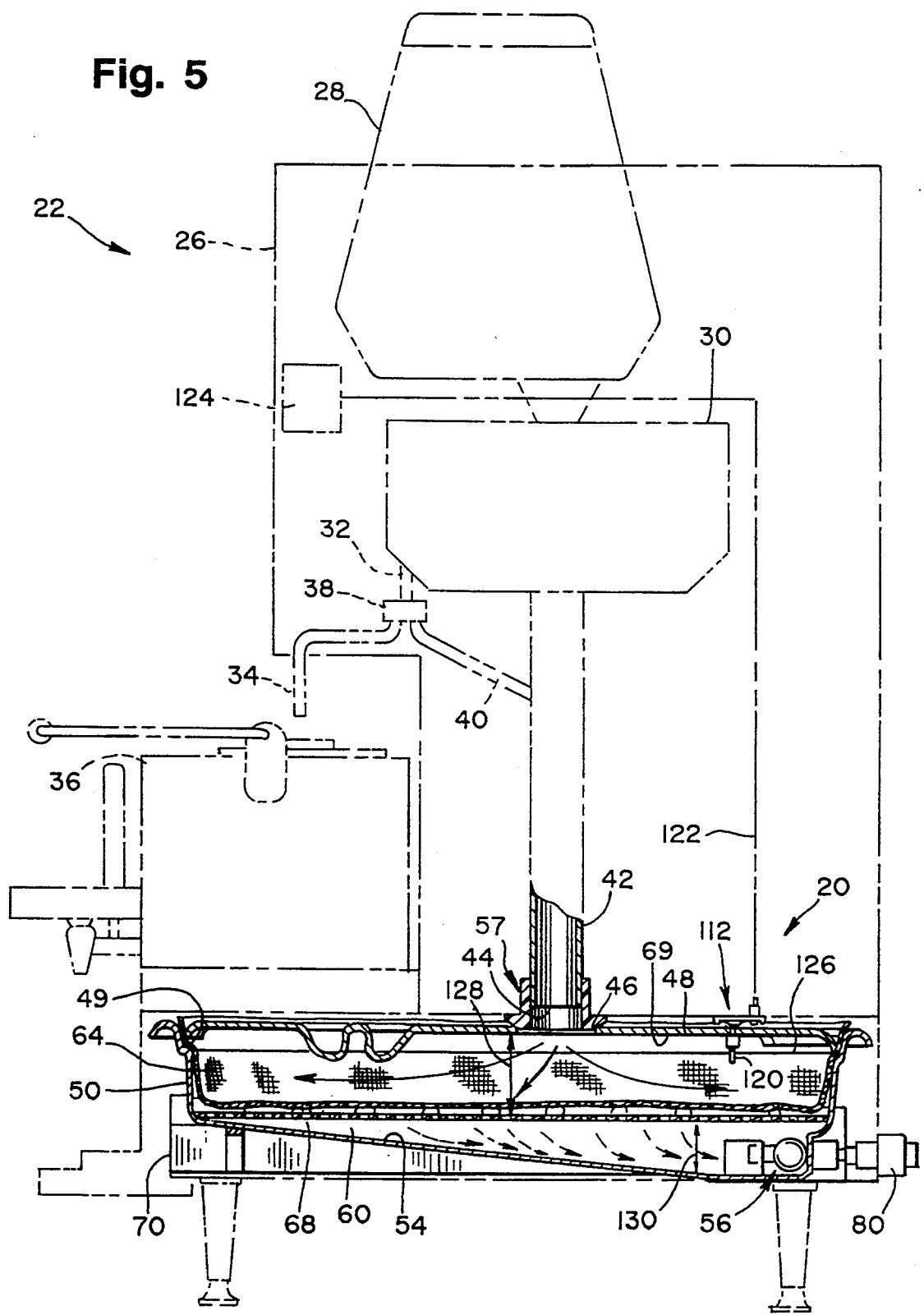
FIG. 5 is a cross sectional side elevational view of the tray assembly of the present invention taken along line 5—5 in FIG. 1 showing the tray assembly in engagement with the drain line exiting from the brewing apparatus.

Referring now to the drawings, wherein like parts are designated by the same reference numerals throughout the figures, FIG. 1 shows a tray assembly 20 (in phantom line) positioned in a beverage brewing apparatus 22. With reference to FIG. 5, the beverage brewing apparatus 22 has a body 26 (shown in phantom line) which houses a material hopper 28 for dispensing material into a brew chamber 30 where a brewed substance is produced. A dispensing line 32 communicates with the brewing chamber 30 for dispensing a brewed beverage produced in the brew chamber 30 through a beverage line 34 into a dispensing decanter 36. During a cleaning cycle, in which the brew chamber 30 is cleaned after a brewing cycle, a valve 38 on the dispensing line 32 directs waste water through a waste line 40 into a larger diameter exhaust line 42. The larger diameter exhaust line 42 communicates with the brew chamber 30 for removing the spent brewing substance therefrom at the end of the brewing cycle. The exhaust line 42 terminates in an entry port 44 at an end distal the brewing chamber 30. The entry port 44 deposits spent brewing substance and waste water into the tray assembly 20 through an entry aperture 46 formed through a cover portion 48 of the tray assembly 20.

Figure 2:
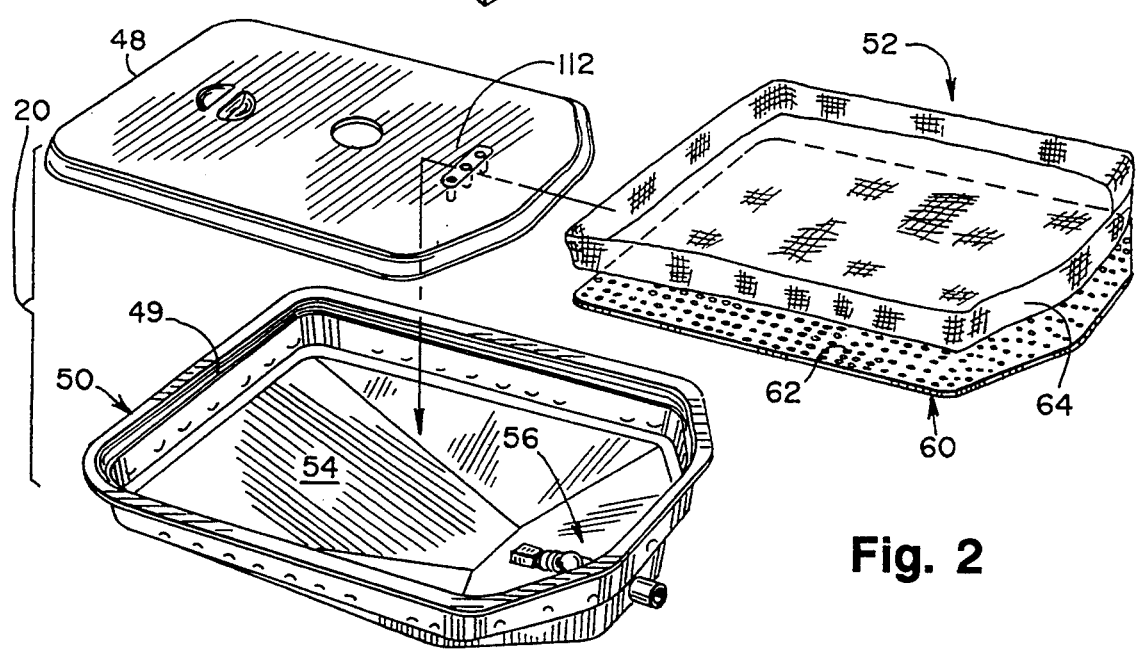
FIG. 2 is an exploded perspective view of the waste tray assembly in which a cover and a liquid separation portion have been removed from a tray body.

With reference to FIG. 2, the tray assembly 20 includes a tray body 50, a liquid separation portion 52 and the cover 48. The tray body 50 has a tub-like shape with a bottom surface 54 which slopes downwardly towards a tray valve assembly 56. A supporting lip 49 is formed around the inside perimeter of the upper edge of the tray body 50 for supporting the cover 48. The supporting lip 49 is formed on the inside surface of the tray body 50 and engages the cover 48 to facilitate the draining of condensation which may collect on the inside surface 69 of the cover 48.

A sealing member 57 is attached to the lowermost end of the exhaust line 42. The sealing member 57 includes a grommet portion 59 and an enlarged flange portion 61. The grommet portion 59 forms a seal between the bottom of the machine 63, through which the exhaust line 42 protrudes, with the flange portion 61 overlying the area of the bottom of the machine 63 facing the entry aperture 46 formed through the cover portion 48. A sloped side 65 of the flange portion 61 forms an interference fit between the sealing member 57 and the cover 48.

The cover 48 is formed with a degree of spring or flexibility to facilitate the interference fit between the sealing member 57 and the cover 48. In other words, when the cover 48 is positioned in the supporting lip 49 of the tray 50, there is a degree of deflection permitted so that the cover 48 may be depressed slightly towards the bottom 54 of the body 50. When the tray assembly 20 is inserted into the brewing apparatus 22, the sealing member presses the cover 48 slightly downwardly so that a portion 67 of the sealing member 57 projects down into the entry aperture 46 formed through the cover 48. This interference fit between the sealing member 57 and the cover 48 prevents moisture from escaping from the tray assembly 20 when the spent brewing substance is disposed therein. Any moisture which evolves from the brewing substance disposed in the tray assembly 20 rises and condenses on an inside surface 69 of the cover 48 and eventually collects and drains back into the tray body 50. The cover 48 and the interference fit with the sealing member 57 prevents moisture from infiltrating the brewing apparatus 22 positioned above the tray assembly.

The liquid separation portion 52 includes a filter material 60. The filter material 60 as illustrated has openings 62 formed therethrough which are small enough to allow the liquids to pass through but not the brewing substances. Additionally, a disposable filter liner 64 can be placed over the filter material to improve the ease and efficiency in removing the spent brewing substances disposed therein. For example, when spent brewing substances are disposed into the filter liner 64, when the tray assembly 20 becomes filled, the tray assembly 20 may be removed from the brewing apparatus 22 and merely the filter liner 64 with the drained brewing substance therein removed for disposal. Such a filter liner 64 would eliminate the need to rinse the filter material 60 which otherwise could remain inside of the brewer body 50.

The filter material 60 spans the tray body 50 and is supported on top of a shoulder portion 66 and beneath a series of protrusions 68 which are spaced away from the shoulder portion 66. The filter material 60 is retained on top of the shoulder portion 66 by the protrusions 68 in a secure yet removable manner.

The tray assembly 20 is supported in the brewing apparatus 22 by side support members 70. The support members support a side edge 72 of the tray body 50. In such a supported position, the bottom surface 54 maintains a slope in order to promote the flow of liquids towards the tray valve assembly 56.

As shown in FIG. 5, spent brewing substances and waste liquids are deposited through the exhaust line 42 onto the liquid separation portion 52 of the tray assembly 20. Once deposited thereon, the liquid portion of the spent brewing substance and waste liquid drains through the liquid separation portion 52 onto the bottom portion 54 for draining out through the tray valve assembly 56.

FIGS. 6 and 7 are referred for the purpose of elaborating on the tray valve assembly 56 as introduced hereinabove. Included in the tray valve assembly 56 is a grommet 74 with an aperture 76 extending therethrough. The grommet 74 sealably extends through a side of the tray body 50. Biased stopper means 78 seals the bore 76 when the tray is disengaged from a drain line 80, which drain line 80 is connected to the body 26 of the brewing apparatus 22. A conduit member 82 is attached to the drain line 80 and is slidably engagable with the bore 76. When the conduit 82 is inserted through the grommet 74, a front end 90 presses against and displaces the biased stopper means 78. In order to promote engagement, an outside portion 84 of the grommet 74 has a conduit receiving recess 86 formed therein to guide the front end 90 of the conduit member 82 into engagement with the grommet 74.

When the tray 20 is inserted into the brewing apparatus 22, the position of the side support members 70 help to align the tray 20 so that the front end 90 of the conduit 82 engages the grommet 74. Once the conduit 82 is engaged with the grommet 74, the front end 90 displaces the biased stopper means 78 to allow liquid to flow from the tray assembly 20. FIG. 6 provides a view of the tray assembly 20 engaged with the drain line 80 such that liquid (as represented by arrows 92) may flow through the conduit member 82 into the drain line 80.

The biased stopper means 78 include a spherical body 94, a biasing member or spring 96, and a retaining member 98. An inside portion 100 of the grommet 74 has a stopper receiving recess 102 formed therein for cooperatively receiving the spherical body 94. When the spherical body 94 is engaged with the stopper receiving recess 102, the bore 76 and the grommet 74 are sealed and no fluids will leak from the tray assembly 20. The spherical body 94 is retained in engagement with the stopper receiving recess 102 by the biasing means 96.

With reference to FIG. 7, the biasing means 96 impose forces (as represented by arrow 104) on the spherical body 94 to retain the spherical body 94 in engagement with the stopper receiving recess 102. The retaining member 98 provides a backstop for the biasing member 96. When the tray is moved (as represented by arrow 106) into engagement with the conduit member 82, the forces (represented by arrow 108) are transferred from the conduit member 82, which is stationary relative to the brewing apparatus, to compress the biasing member 96 against the retaining member 98. Compression of the biasing member 96 disengages the spherical body 94 from the stopper receiving recess 102. Apertures 110 are formed through the sides of the front end 90 of the conduit member 82 for allowing fluids 92 to flow therethrough and into the conduit member 82. As shown in FIG. 7, the apertures 110 are not exposed until, as shown in FIG. 6, the spherical body 94 is disengaged from the stopper receiving recess 102 and the conduit 82 protrudes from the bore 76.

Sensor means or a sensor assembly 112 is attached to the cover 48 and a cooperatively abutting portion 114 of the brewing apparatus 22. The sensor assembly 112 includes a tray contact 116 mounted to the tray assembly 20 and a mating contact 118 mounted to the portion of the brewing apparatus 114. The tray contact as shown in FIG. 8 is attached to the cover 48 of the tray assembly 20 and has a stud portion 120 which extends a distance into the tray body.

As shown in FIGS. 2 and 3, there are three tray contacts 116 included in the sensor assembly 112. Two of the three tray contacts provides information on the positioning of the tray assembly 20 in the brewing apparatus 22. Contacts 116a, 116b are dedicated as positioning contacts 116a, 116b and are tied with a common strap. When the tray 20 is properly positioned, the contacts 116a, 116b complete the circuit with corresponding mating contacts 118a, 118b (not shown).

The other tray contact 116c cooperatively engages a corresponding mating contact 118c. When the level sensing contacts 116a, 116b are engaged with the corresponding mating contacts 118a, 118b, an open circuit is created between the contacts 116a, 116b and contact 116c over a control line 122 to a control unit 124. With reference to FIG. 8, when the level of material and/or liquid (represented by line 126) reaches a predetermined level, the material immerses the stud portions 120*a*, 120*b*, 120*c* of the corresponding tray contacts 116*a*, 116*b*, 116*c*, thereby shorting the circuit between the two contacts 116*a*, 116*b* and through moist material to contact 116*c*. Thus, the contacts 116*a*, 116*b*, 116*c* indicate, over control line 122 to the control unit 124, that the level has reached a predetermined height. The control unit 124 in turn will provide a form of indication to an operator that the tray assembly 20 must be emptied.

An example of the control unit 124 indication include energizing a light or some other warning that the tray assembly 20 is full. Additionally, the control unit 124 can be programmed to prevent further brewing until the tray assembly 20 is emptied. In this regard, when an operator tries to initiate a brew cycle with a full tray assembly 20, the control unit 124 controls the brewing apparatus 22 to prevent further brewing. Once the tray assembly 20 has been removed and emptied, the level of the material or fluids therein drops below the predetermined high level 126 to permit further brewing by the brewing apparatus 22.

In use, the present invention comprises the tray assembly 20 including the liquid separation, level sensing, position sensing, and controllable drain valve features. The tray assembly 20 is inserted into the brewing apparatus 22 to receive and retain spent brewing substances exhausted by the brewing apparatus 22. When the tray assembly 20 is properly positioned in the brewing apparatus 22, the positioning contact 116*a* contacts a corresponding mating contact 118*a* to indicate that the tray assembly 20 is properly engaged with the conduit member 82 attached to the drain line 80. The side support member 70 supports the tray assembly 20 while positioned in the brewing apparatus 22 to maintain the bottom surface 54 of the tray body 50 in a sloped orientation toward the tray valve assembly 56.

When the tray assembly 20 is inserted into the brewing apparatus 22, the sealing member 57 slightly downwardly deflects the cover 48 towards the bottom 54 of the tray body 50. The cover 48 has a degree of yieldability. When the sealing member 57 is positioned in engagement with the aperture 46, a portion 67 of the sealing member 57 extends into the aperture 46 to form an interference fit between the sealing member 57 and the cover 48. Since the cover 48 is slightly deflected downwardly by the sealing member 57, a tighter seal is formed between the cover 48 and the supporting lip 49. The seal between the cover 48 and the lip 49 as well as the interference fit between the sealing member 57 and the aperture 46 prevent steam and other moisture from escaping and infiltrating the brewing apparatus 22.

Once the tray assembly 20 is positioned in the brewing apparatus 22, the entry port 44 is coincident with the entry aperture 46 through the cover 48. Thus positioned, the tray assembly 20 is ready for receiving and retaining spent beverage brewing substances from the brewing apparatus through the exhaust line 42. When brewing substances are deposited into the tray body 50, they are received in the receiving and retaining space or first area 128 defined between the entry aperture 46 and the liquid separation portion 52. When the spent brewing substance is emitted from the entry port 44, the material is generally in a slurry form having both liquid and solid components. The slurry form of the spent brewing substance spreads out over the liquid separation portion 52 in a generally even, self-leveling manner. Subsequent emissions from the brewing apparatus 22 also generally flow over the prior drained material in a generally even manner.

The generally evenly distributed spent brewing substance is separated into liquid and solid components by the liquid separation portion 52. The liquid portion drains through the filter material 60 of the separation portion 52 and flows into the liquid collection space 130 defined between the liquid separation portion 52 and the bottom surface 54. As the liquid collects in the collection space 130, it drains from the tray assembly 20 through the tray valve assembly 56 into a drain line 80.

The tray valve assembly 56 includes the grommet 74 mounted in the side of the tray body 50 and biasing stopper means 78 which plug the aperture 76 of the grommet 74 to prevent leakage from the tray assembly 20 when it is disengaged from the conduit member 82. When the tray assembly 20 is inserted into the brewing apparatus 22, the front end 90 of the conduit member 82 pushes against the spherical body 94 of the biased stopper means 78 to compress the biasing member 96 against the retaining member 98 thereby disengaging the spherical body 94 from the stopper recess 102 in the grommet 74. The apertures 110 formed through the sides of the front end 90 allow fluid to flow from the tray body 50 through the conduit member 82 and out through the drain line 80.

As the spent brewing material accumulates in the tray assembly 20, the level of the material rises to a predetermined full tray level 126. When the full tray level 126 is attained, the stud portions 120 of the level sensing contacts 116*b*, 116*c* are immersed and complete a circuit therebetween to indicate that the high level 126 has been attained. The completed circuit is sensed by the controller 124 over the control line 122 providing indication to a user and/or controllably stopping future brewing cycles.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A tray assembly for use in receiving and retaining spent brewing substances and the like and separating a liquid portion therefrom, said tray assembly comprising: a tray body having an entry aperture for receiving spent brewing material and a bottom surface; liquid separation means retained in said tray body for drawing off liquids from spent brewing material deposited thereon; and sensor means for sensing the level of spent brewing material in said tray body; said sensor means including a tray contact attached to said tray body and extending a distance into said tray body, and a mating contact operatively associated with the source of spent brewing material, said tray contact being operatively engagable with said mating contact, when material in said tray body accumulates to a level where said contact is immersed in material, said sensor means completes a circuit with said mating contact indicating a full tray condition.

2. A tray assembly according to claim 1, further including a first area in said tray body between said entry aperture and said liquid separation means defining a material receiving and retaining space, and a second area in said tray body between said liquid separating means and said bottom defining a liquid collection space; drained material is retained in said first area for removal at a later time and liquid drawn off of said material and collecting in said second space flowing from said tray assembly out through a tray valve assembly; said tray contact extending into said first area a predetermined distance for sensing the level of drained material accumulated in said first area.

3. A tray assembly according to claim 2, wherein material is deposited into said tray assembly in predetermined quantities, said tray contact extending into said tray body a distance proportional to quantities of material, said tray contact extending into said tray body at least a distance equal to one quantity of material below a predetermined full level for prevent overfilling of said tray assembly.

4. A tray assembly according to claim 1, further including a controllably sealable tray valve assembly attached to said tray body and operatively engagable with a drain line for draining liquids, separated from moist material disposed thereon, from said tray body; a first positioning contact on said tray body engaging a second positioning contact operatively associated with the source of spent brewing material; said first and second contacts being relatively positioned for completing a circuit when said tray is properly engaged with a drain line to indicate such proper engagement.

5. A tray assembly for use with a brewing apparatus for receiving and retaining moist material, such as spent brewing substances and the like, and separating a liquid portion therefrom, said tray assembly comprising:

a tray body having an open end;

a cover member covering said open end of said tray body, said cover member having a material receiving aperture formed therethrough in communication with said brewing apparatus for receiving moist material therefrom;

liquid separation means retained in said tray body for drawing off liquids from spent brewing material deposited thereon;

a sealing member positioned between said brewing apparatus and said material receiving aperture for sealing said tray assembly to prevent steam and moisture from escaping therefrom;

a controllably sealable tray valve assembly attached to said tray body and operatively engageable with a drain line for draining liquids from said tray body; and sensor means for sensing the level of spent brewing material in said tray body, said sensor means including a tray contact attached to said cover and extending a distance into a cavity defined by said tray body, and a mating contact operatively associated with said brewing apparatus, said tray contact being operatively engageable with said mating contact to indicate proper engagement of said tray with said brewing apparatus, when material in said tray body accumulates to a level where said contact is immersed in material, said sensor means completes a circuit with said mating contact indicating a full tray condition.

* * * * *